UNITED STATES PATENT OFFICE.

GEORGE W. ABELL, OF INDIANAPOLIS, INDIANA.

COMPOSITION OF MATTER FOR COVERING WALLS OR OTHER SURFACES.

SPECIFICATION forming part of Letters Patent No. 469,394, dated February 23, 1892.

Application filed November 20, 1891. Serial No. 412,547. (No specimens.)

*To all whom it may concern:*

Be it known that I, GEORGE W. ABELL, a citizen of the United States, residing at Indianapolis, in the county of Marion and State of Indiana, have invented certain new and useful Improvements in Compositions of Matter for Covering Walls or other Surfaces; and I do declare the following to be a full, clear, and exact description of the invention, such as will enable others skilled in the art to which it appertains to make and use the same.

My composition consists of the following ingredients, combined in substantially the proportions stated, viz: dry or air-slaked lime, five hundred to eight hundred pounds; linseed-oil-cake meal, one hundred to three hundred pounds; dry oxide of zinc, fifty to one hundred pounds; sugar, fifteen to twenty-five pounds; flour of sulphur, fifteen to twenty-five pounds. I bring together these ingredients and thoroughly mix and mingle them dry. To prepare plaster for walls and other surfaces, I use from twenty-five to fifty pounds of the mixture or product so formed with eight hundred pounds of sharp sand, four hundred pounds of ground gypsum, and twenty pounds of wood pulp. These ingredients are all thoroughly mixed and mingled dry. Then I add sufficient water and further mix to produce a mortar of the consistency required.

The mixture or product secured by the mixing of lime, linseed-oil-cake meal, oxide of zinc, sugar, and flour of sulphur regulates the setting of the mortar and places the time of setting under the control of the operator, causes a complete union of the particles of the mortar, renders the mortar plastic in working, causes it to spread easily, and gives it increased hardness and adhesiveness, and the whole composition produces a plaster of superior finish and smoothness that does not crack in hardening, and that is capable of resisting the action of water to an extent nearly equal to hydraulic cement. Mortar so prepared may be applied to any surface desired, as brick, stone, wood, &c., in any style of ornamentation or figure desired.

I am aware that linseed-oil-cake meal has been included in the composition on which Letters Patent No. 445,815 were granted February 3, 1891. I am also aware that sand, lime, ground gypsum, and water have been used in preparing plaster; but I am not aware that said other ingredients have ever been so used.

What I claim, and desire to secure by Letters Patent of the United States, is—

The herein-described composition of matter to be used for covering walls and other surfaces, consisting of dry oxide of zinc, sugar, flour of sulphur, wood pulp, linseed-oil-cake meal, ground gypsum, lime, sand, and water in proportion and union substantially as specified.

In testimony whereof I affix my signature in presence of two witnesses.

GEORGE W. ABELL.

Witnesses:
W. O. CLOUGH,
J. T. LECKLIDER.